(12) United States Patent
Angelo et al.

(10) Patent No.: US 6,288,843 B1
(45) Date of Patent: Sep. 11, 2001

(54) APPARATUS, METHOD AND SYSTEM FOR 3-D AND PANORAMIC IMAGING

(75) Inventors: Michael F. Angelo, Houston; William (Bill) Floyd Whiteman, Cypress; Ramkrishna Prakash, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/580,765

(22) Filed: May 30, 2000

Related U.S. Application Data

(63) Continuation of application No. 09/226,453, filed on Jan. 6, 1999, now Pat. No. 6,118,589.

(51) Int. Cl.[7] .............................. G02B 27/10; G02F 1/03; G02F 1/07
(52) U.S. Cl. ........................... 359/621; 359/627; 359/245
(58) Field of Search ................................ 359/245, 621, 359/625, 627, 629, 640

(56) References Cited

U.S. PATENT DOCUMENTS

| | | | |
|---|---|---|---|
| 3,740,560 | * | 6/1973 | Wentz ................................. 250/199 |
| 5,704,703 | * | 1/1998 | Yamada et al. ........................ 362/27 |
| 6,057,965 | * | 5/2000 | Angelo et al. ........................ 359/620 |
| 6,215,920 | * | 4/2001 | Whitehead et al. ................... 385/18 |

FOREIGN PATENT DOCUMENTS 11-14831 * 1/1999 (JP) ................................ G02B/5/30

* cited by examiner

Primary Examiner—Ricky Mack
(74) Attorney, Agent, or Firm—Williams, Morgan & Amerson, P.C.

(57) ABSTRACT

An apparatus, method and system are provided for scanning documents, and creating holographic and panoramic images. The apparatus provides two sets of prisms, one set of which is made of electro-optical material. The prisms are arranged in alternating rows to form a sheet. The prism sheet can be laid flat or rolled into a cylinder. A sequencer is used to activate individual electro-optical prisms so that the image is reflected into the sheet. A second prism is used to reflect the image into an image receptor such as a camera. By sequentially activating the electro-optical prisms, successive image portions of an object or objects can be presented to the image receptor. If the image receptor accepts digital input, the sequential images can be post-processed in a microprocessor to create a holographic or panoramic image. Similarly, images of documents can also be scanned and the images received can be digitized for processing, storage and/or transmission. The prism sheet is flexible and can be rolled into a variety of shapes for creating holograms or scanning panoramic images. Moreover, the prisms can be curved, allowing prism sheets to be shaped into spheres or conic sections.

23 Claims, 8 Drawing Sheets

APPARATUS, METHOD AND SYSTEM FOR 3-D AND PANORAMIC IMAGING

BACKGROUND OF THE INVENTION

This application is a continuation of application No. 09/226,453, now U.S. Pat. No. 6,118,589 that was filed on Jan. 6, 1999.

FIELD OF THE INVENTION

The present invention is related to image scanning. More particularly, the present invention is related to scanning three-dimensional images of an object to create a holographic image or to create a panoramic view of a scene into a digital or analog format.

DESCRIPTION OF THE RELATED TECHNOLOGY

Holographic images have delighted people for many years. However, creating realistic holographic images has been a problem. The most difficult problem is not with the camera, but with the mechanisms used to position the camera around the object of the hologram. In one prior art system, the object is placed on a bench and the camera is moved slowly around the object, taking pictures along the way. Fairly heavy and cumbersome equipment must be used to minimize the vibration of the camera as it circumnavigates the object. Otherwise the resulting holographic image is blurred. Even with the heavy equipment, however, vibration-induced blurring cannot be eliminated.

An alternative prior art system places the object on a turntable. While this allows the camera to remain stationary, this alternative prior art system merely shifts the vibration problem from the camera to the object with similar blurred results. As with the moveable-camera prior art system, the holographic image is subject to additional blurring if the mechanism used to monitor the rotation of the camera or the rotation of the object is out of alignment.

Prior art systems for taking panoramic images suffered from problems similar to their holographic counterparts. For panoramic photographs, the camera is mounted onto a turntable and rotated while taking periodic snapshots of the surrounding scene. Again, as with the prior art holographic systems, the panoramic systems of the prior art are subject to vibration-induced blurring. Solutions have been devices to minimize or eliminate the vibration-induced blurring problem, however, these solutions often entail stopping the camera periodically, allowing the deceleration forces to dampen, and then snatch a photograph before moving on. Unfortunately, while this solution does reduce blurring, it does take considerably longer and is not suited to real-time or near real-time image (data) acquisition.

There is, therefore, a need in the art for a system and method for taking holographic and panoramic images quickly and with little or no blurring.

SUMMARY OF THE INVENTION

The present invention solves the problems inherent in the prior art by providing a system, apparatus, and method for obtaining scanned images of objects, holographic images of objects, and panoramic images of scenes.

The system of the present invention provides two sets of prisms. The first set of prisms is transparent and is typically made of glass or a standard fiber optic material. Each set of prisms has at least two prisms that are arranged in a sawtooth pattern of alternating prisms (teeth) and gaps. The first set of prisms has a base-down orientation. The second set of prisms is made of an opto-electric material or electro-optical material that changes its reflective properties in either the presence or absence of an electromagnetic field. The electromagnetic field can be induced by, for example, an electric current. Specifically, the electro-optical material would become reflective when, for example, an electric current is run through it but the same material would be transparent in the absence of an electric current. Conversely, another suitable electro-optical material could be reflective in the absence of an electric current and become transparent when an electric current is applied. Other suitable electro-optical materials may be activated thermally or by other methods in addition to, or in lieu of, being activated electrically without departing from the spirit of the present invention.

As with the first set of prisms, the second set of prisms has at least two prisms arranged in a sawtooth pattern having prisms (teeth) and gaps. The second set of prisms, however, are oriented differently from the first set of prisms. The prisms of the second set of prisms are constructed and arranged to fit within the gaps of the first set of prisms and, likewise, the prisms of the first set of prisms are designed to fit within the gaps of the second set of prisms in order to form a solid, but potentially flexible, prism sheet.

An image receptor, such as a camera or digital light receiver, is the second device of the imaging system of the present invention. The image receptor is designed to receive images reflected from the prisms of the second set of prisms. A third device, called a sequencer, is connected to each of the prisms of the second set of prisms. The sequencer is designed to apply and remove an electromagnetic field to each of the prisms of the second set of prisms in order to change the reflection properties of the affected prism. The sequencer can apply (or remove) the electromagnetic field individually to each prism of the second set of prisms, or it can do so to two or more prisms simultaneously. Typically, the sequencer is connected either to a separate microprocessor, or to the microprocessor in the image receptor so that the reflecting prisms can be synchronized with the image receptor.

In operation, the sequencer sequentially applies and then removes the electromagnetic field to each of the prisms of the second set of prisms. As the electromagnetic field is applied to the prism, the electro-optical properties of the prism change and allow an image of a portion of an object to be reflected by the prism affected by the electromagnetic field. The reflected image passes through the prisms of the first set of prisms as well as the unaffected prisms of the second set of prisms until the image is received by the image receptor that is positioned at one end of the prism sheet. The sequencer then removes the electromagnetic field from the first prism and then applies it to the next prism in order to reflect an image from a different portion of the object into the image receptor. The process of applying and then removing the electromagnetic field to different prisms of the second set of prisms is repeated until all of the desired images of the object are obtained. Once the images are obtained, post-processing of the images can be made in order to construct a single image of the entire object.

In order to take holographic images, the ends of the prism sheet are rolled into a cylinder and joined together with a junction prism. In this case, instead of the image receptor being positioned at one end of the prism sheet, it is now positioned outside of the cylinder in line of sight with the junction prism. The cylinder is then placed around the object to be scanned. As before, the sequencer is used to sequentially apply and remove an electromagnetic field to one or more of the prisms of the second set of prisms to induce those prisms to reflect an image of a portion of the object. This image is then passed through the interior of the cylinder (i.e., through the prisms of the first set of prisms and the prisms of the second set where no electromagnetic field is applied) until the image reaches the junction prism, which then reflects the image into the image receptor. As before, this process is repeated with different prisms of the second set of prisms until all of the desired images are obtained. As with the previous example, once all of the images are obtained, post-processing of the images can be made in order to construct a single holographic image of the entire object. The post-processing can be done with an embedded microprocessor in near real-time to provide near instantaneous, or even animated holographic images of objects.

The present invention is also able to take panoramic images of scenes. As with the holographic image process, the ends of the prism sheet are rolled into a cylinder and joined together with a junction prism. However, unlike the holographic procedure, the prism sheet is rolled in the opposite direction so that the base of the prisms of the first set of prisms are facing out of the cylinder rather than into the interior of the cylinder. Moreover, instead of the image receptor being positioned outside of the cylinder, it is now positioned within the cylinder in line of sight with the junction prism. The cylinder is then placed at the center of the scene to be scanned. As before, the sequencer is used to sequentially apply and remove an electromagnetic field to one or more of the prisms of the second set of prisms to induce those prisms to reflect an image of a portion of the scene. This image is then passed through the interior of the cylinder (i.e., through the prisms of the first set of prisms and the prisms of the second set where no electromagnetic field is applied) until the image reaches the junction prism, which then reflects the image into the image receptor. As before, this process is repeated with different prisms of the second set of prisms until all of the desired images are obtained. Again, as with the previous examples, once all of the images are obtained, post-processing of the images can be made in order to construct a single panoramic image of the entire scene. The post-processing can be done with an embedded microprocessor in near real-time to provide near instantaneous, or even animated panoramic (movie) images of scenes.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 10:
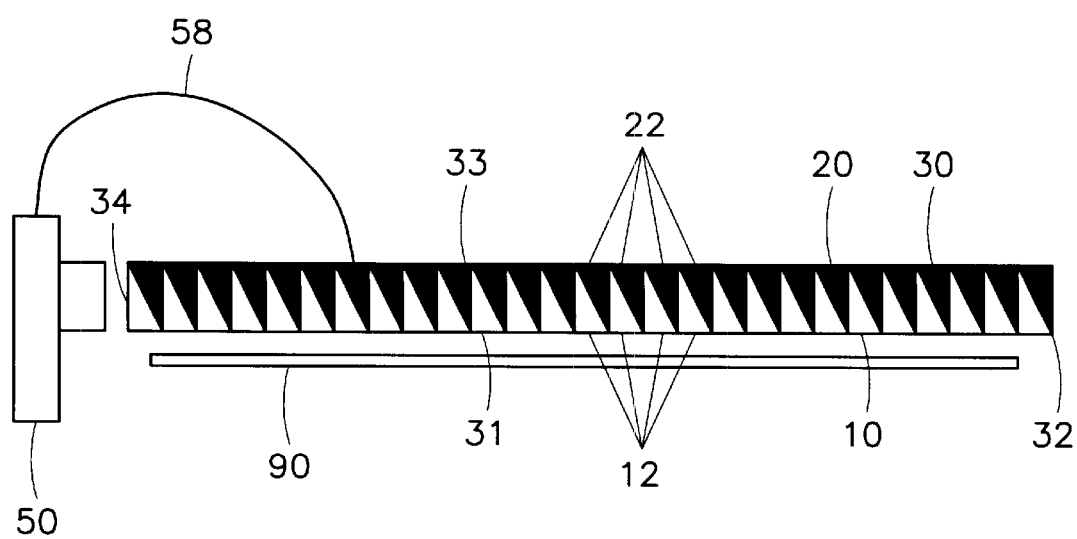
FIG. 10 is a side schematic view of the scanner system of the present invention.

The simplest embodiment of the present invention is shown in FIG. 10. The prism sheet 30 is composed of a first set of prisms 10 and a second set of prisms 20, as shown in FIG. 10. An image receptor 50 is positioned in proximity to the distal end 34 of the prism sheet 30. An object 90, in this instance a flat sheet of paper, is placed adjacent to the first side 31 of the prism sheet 30 (i.e. the side made up of the bases 14 of the first prisms 12 of the first set of prisms 10) as shown in FIG. 10. In this embodiment, a sequencer and its associated microprocessor is embedded within the image receptor 50 that is connected to the second set of prisms 20 via connector cord 58. The connector cord 58 connects each of the prisms 22 of the second set of prisms 20 to the image receptor 50. The sequencer in the image receptor 50 is able to selectively place one or more of the prisms 22 under an electromagnetic field by generating, for example, a voltage across the prism itself. The prisms 22 of the second set of prisms 20 are constructed of an electro-optical material that changes its reflective properties in the presence (or absence) of an electromagnetic field, such as the one generated by a voltage generator that is controlled by the sequencer. Specifically, the second set of prisms 20 is made of an opto-electric material or electro-optical material that changes its reflective properties in either the presence or absence of an electromagnetic field. The electromagnetic field can be induced by, for example, an electric current. The electro-optical material would become reflective when, for example, an electric current is run through it but the same material would be transparent in the absence of the electric current. Conversely, another suitable electro-optical material could be reflective in the absence of an electric current and become transparent when an electric current is applied. Essentially, the reflectiveness or transparency of the material of the second set of prisms 20 can be controlled by applying or removing something like an electromagnetic field or thermal gradient. This enables the reflectiveness or transparency of the second set of prisms 20 to be set like a switch and can be controlled in the same manner with mechanisms well known in the art. Moreover, other suitable electro-optical materials may be activated thermally or by other methods in addition to, or in lieu of, being activated electrically without departing from the spirit of the present invention.

In the preferred method of operation, all but one of the prisms 22 of the second set of prisms is put in a non-reflective state by the sequencer of the image receptor 50. Consequently, only one portion of the object 90 is reflected off of the reflection-activated prism 22. The image reflected off of that prism 22 is passed through the other (reflection-deactivated) prisms 22 and prisms 12 until the image reaches the image receptor 50 where the image is received, processed, stored and/or transmitted. Once the first image is obtained, the sequencer then applies the electromagnetic field to the prism 22 adjacent to the first-activated prism 22. Thus a second image of the object 90, covering a slightly different portion of the entire object 90, is reflected into the image receptor 50. This process of applying and them removing electromagnetic fields on the prisms 22 is repeated until the image receptor 50 has received a sufficient number of sequentially different images to comprise the entire object 90. The images received by the image receptor 50 can then be processed and, with appropriate processing capability, a digital reproduction of one side of the object, such as a document, can be obtained.

Figure 1:
FIG. 1 is a side view of a plate before milling.
Figure 2:
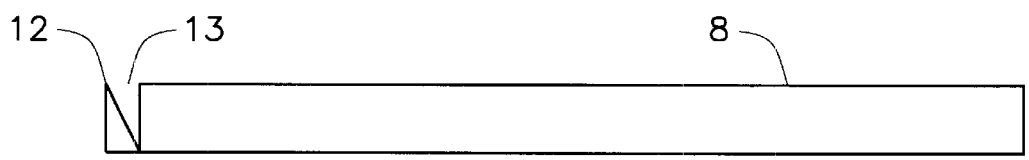
FIG. 2 is a side view of a plate after a single milling action.
Figure 3A:
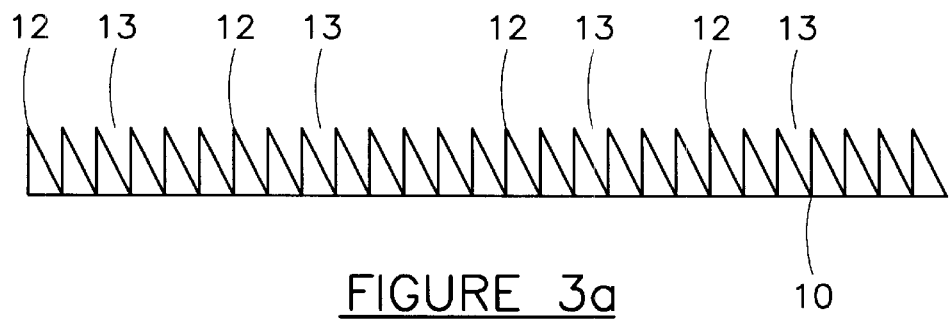
FIG. 3a is a side view of a first set of prisms of the present invention.
Figure 3B:
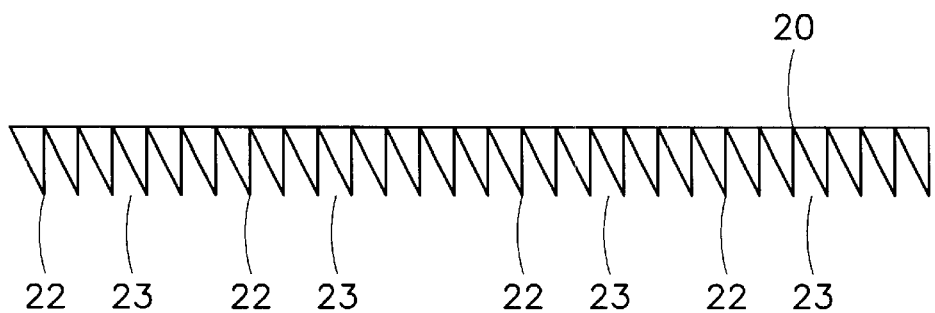
FIG. 3b is a side view of a second set of prisms of the present invention.

The prism sheet 30 can be constructed in the following manner. First, a single sheet 8 of any optically transparent material, such as glass, or a fiber optic material, or the like, is laid on the work area of a milling device as shown in FIG. 1. The milling device used must be capable of performing defraction grading sufficient to mill a gap 13 and thereby form a first prism 12 as shown in FIG. 2. The milling process is continued to form additional prisms 12 by milling additional gaps 13 into a sawtooth pattern of alternating teeth (prisms) and gaps to create a first set of prisms 10, oriented as shown in FIG. 3a. The first set of prisms 10 must contain at least two prisms 12.

The second set of prisms 20 can be made in a manner similar to the first set of prisms 10, with at least two prisms 22 making up the second set of prisms 20. However, the second set of prisms 20 must be constructed of an electro-optical material that changes its reflection properties when the intensity of an electromagnetic field in proximity to the prism is changed. The electromagnetic field can be induced (applied) by, for example, a voltage generator, or other methods well known in the art. The electro-optical material of the second set of prisms 20 can be of the type that makes the prism 22 reflect an image when the electromagnetic field is present and pass-through the image (i.e., be transparent) when the electromagnetic field is removed (i.e., the absence of an electromagnetic field). Moreover, the electro-optical material of the second set of prisms can also be of the type that makes the prism 22 transparent in the presence of an electromagnetic field and to reflect an image in the absence of an electromagnetic field. While either scenario is equally useful to the present invention, these properties must be known before an object is scanned so that the sequencer 60 can be programmed in order to make the particular prism 22 reflective or transparent at the proper time.

Figures 5, 6:
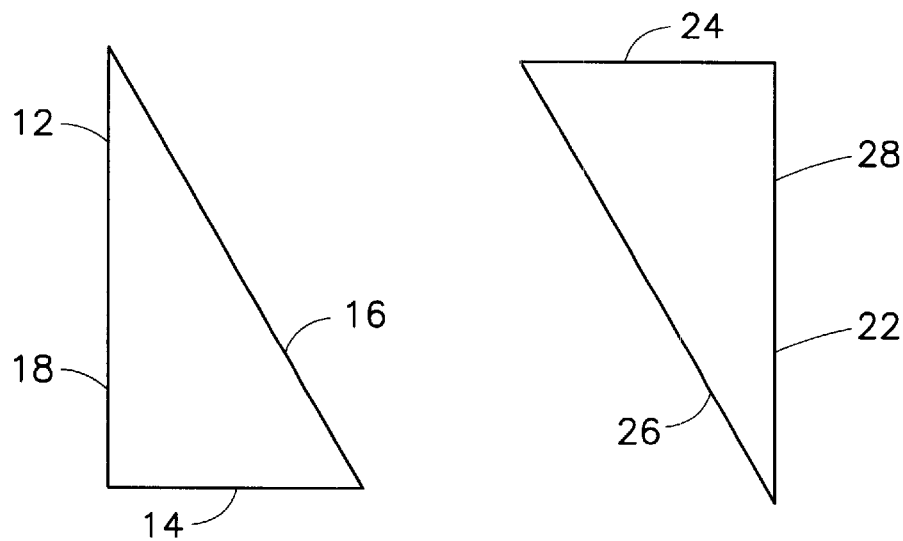
FIG. 5 is a side view of a prism of the first prism set of the present invention.
FIG. 6 is a side view of a prism of the second prism set of the present invention.
Figure 7:
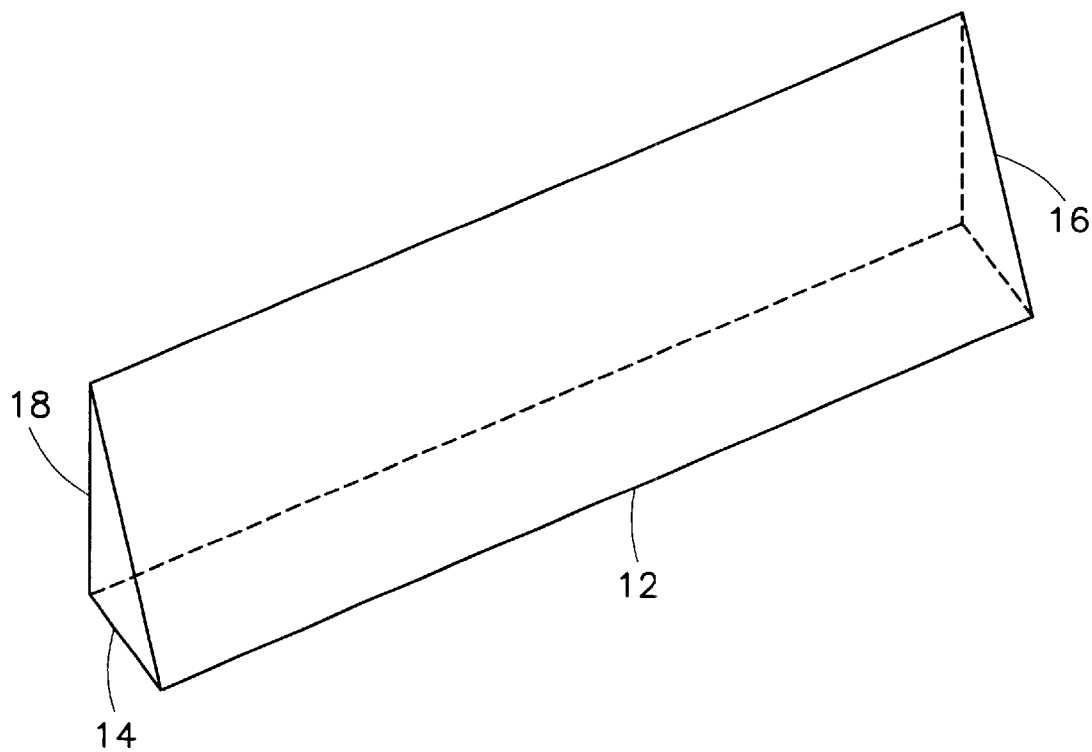
FIG. 7 is a side-top-front perspective view of a prism of the present invention.

The structure of a first prism 12 is shown in FIG. 5. Referring to FIG. 5, the prism 12 has a base 14 with a back 18 that is substantially perpendicular to the base 14. The slope 16 is essentially the hypotenuse of the triangle. The angle of the slope 16 depends upon the application involved. The slope 16 need merely allow the image to pass through to another prism and allow the image to remain within the prism sheet 30 much as light remains within a fiber-optic cable when it is either flat or bent. It will be understood by those skilled in the art that the above-described triangular shape is merely illustrated and that a wide range of prism shapes could be used with equal or better effect within the scope of the present invention.

The structure of the second prism 22 is shown in FIG. 6. As with the first prism 12, the second prism 22 has a base 24, a back 28. The slope of the prism 22 acts as a reflector 26 when activated with the appropriate electromagnetic field. The angle of the reflector 26, as well as the length of the base 24 and the back 28 are such that, when the reflector 26 of the prism 22 is placed adjacent to the slope 16 of the first prism 12, a rectangle is formed, i.e. the prism 22 neatly fills the gap 13. The second set of prisms 20 can be formed by the same milling process that formed the first set of prisms 10, i.e., into a sawtooth pattern of alternating teeth (prisms 22) and gaps 23.

Figure 4:
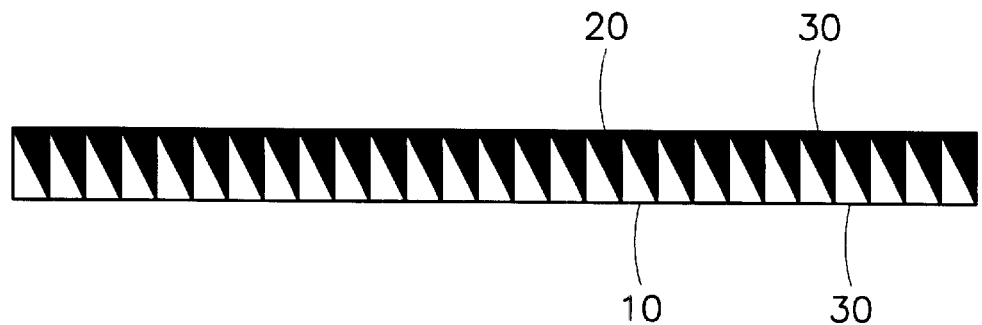
FIG. 4 is a side view of a prism sheet of the present invention.

The second set of prisms 20 is laid upon the first set of prisms 10 in order to form the prism sheet 30 as shown in FIG. 4. Alternatively, if a suitable electromagnetic material is used for the second set of prisms 20, the material can also be sprayed or poured onto the first set of prisms 10 to fill the gaps 13. The electromagnetic material can then be dried or cured to form the second set of prisms 20 and thus complete the prism sheet 30.

Figure 11:
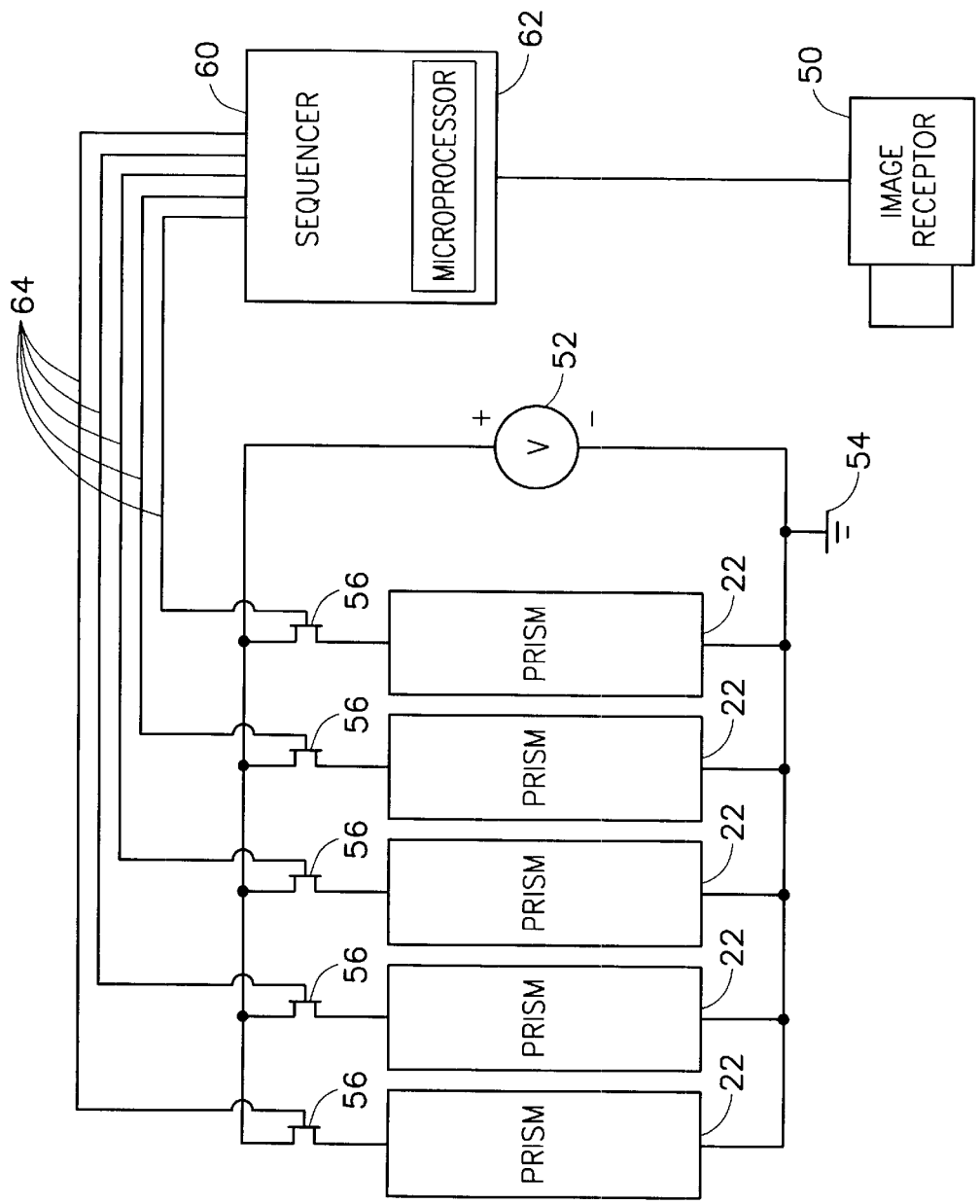
FIG. 11 is an electrical schematic of the present invention.

Once the prism sheet is constructed, each of the prisms 22 of the second set of prisms 20 is connected to a sequencer 60 as shown in the electrical schematic of FIG. 11. Referring to FIG. 11, prisms 22 are each connected to a ground 54 at one end of the prism 22. On the opposite end from the ground connect, a switch 56 is attached to the prism 22. The switch 56 may be any switch that satisfies the power loads and switching speed requirements. Suitable switches 56 can be FETs, JFETs, MOSFETs or other semiconductor devices known in the art. Although slow and bulky, relays and other similar devices could also be used in this capacity with the present invention. The only requirements of the switch 56 are that they be controllable by the sequencer 60 and act quickly enough to allow the proper sequencing of images within the desired period of time. The only requirement of the sequencer 60 is that it be able to selectively apply and remove the triggering means (e.g., an electromagnetic field or thermal gradient) to each of the prisms 22 that must to be made reflective or transparent in order to obtain the desired number of images from the object in question.

The switches 56 that are connected to the prisms 22 are also connected both to the positive side of the voltage generator 52 and to the sequencer 60 via switching leads 64. The sequencer 60 may include a microprocessor 62 to control the sequencing of events, or the microprocessor could be embedded within a separate device (not shown) or within the image receptor 50. If the microprocessor is located elsewhere, the sequencer 60 receives sequence instructions from the other device, thereby allowing synchronized imaging that minimizes the amount of time to scan an object, or to maximize the quality of the image obtained. Consequently, the image receptor 50 may contain a number of option features. However, the only requirement of the image receptor 50 is that it be able to receive images reflected from at least one of the prisms 22.

The prism sheet 30 is preferably flexible. A flexible prism sheet 30 allows the present invention to be bent and/or folded for portability and allows for scanning of flat or substantially flat (i.e., not completely flat) objects. In the case of the flat object 90 (see FIG. 10), the prism sheet 30 can be laid on the object to help flatten it out, or the prism sheet 30 can be flipped over and the object 90 laid upon the prism sheet 30. Likewise, the prism sheet 30 may be rolled into a cylinder and the image receptor 50 repositioned to obtain holographic and panoramic images, as described below.

The present invention is also useful for taking images from one location and transmitting and displaying them at another location. For instance, it is known that aerodynamic restraints prompt engineers to design supersonic transport aircraft, such as the Anglo/French Concorde, with low aspect ratio wings. Low aspect ratio wings have trouble generating lift at low airspeeds, such as those encountered during landing procedures. To compensate, these aircraft must maintain a substantial pitch angle. Unfortunately, this pitch angle is so high that pilots have trouble looking over the nose of the aircraft to see the landing field. While the cockpit can be raised to allow better viewing, this cannot be done without substantial drag penalties that greatly increase the aircraft's cost and operating expense. The present invention can solve this problem. A prism sheet 30 can be fitted onto the underside of the fuselage and, due to its flexibility, it can be shaped to conform to the aircraft's external streamlines. A second prism sheet is positioned underneath the pilot so that the second prism sheet 30 is in the line of sight of the first prism sheet, the runway, and the pilot's eyes when the plane is at its landing pitch angle. Thus, the first prism sheet can take an image of the runway, capture the image in its image receptor 50, transmit the digitized signals to an emitter (not shown) that is attached to the second prism sheet 30. The emitter then projects the image into the second prism sheet 30 and, by performing the previously described methodology in reverse, project an image of the runway into the second prism sheet that is reflected into the pilots eyes. During landing, the pilot can look toward the floor between his legs at the second prism sheet and have a correctly oriented view of the runway. Thus, with the present invention, there is no need to sacrifice quality and quantity of view to obtain more aerodynamically shaped vehicles. This is but one example of utilizing the present invention to display on one side of a solid structure the images seen from the opposite side of the structure. The present invention is particularly useful for deep-sea diving applications, where essential viewing is blocked by thick hulls. Prism sheets can be fitted to both sides of the hulls in order to receive (on the outside) and then to project undersea images to the crew within the diving vehicle. The solid state, electronic nature of the present invention allows it to receive and to project images at rates higher than the focusing capability of the human eye (approximately 75 MHz). This allows the present invention to project a solid-appearing image that does not strobe or flicker, making it ideal for virtual reality or other image processing.

Figure 8:
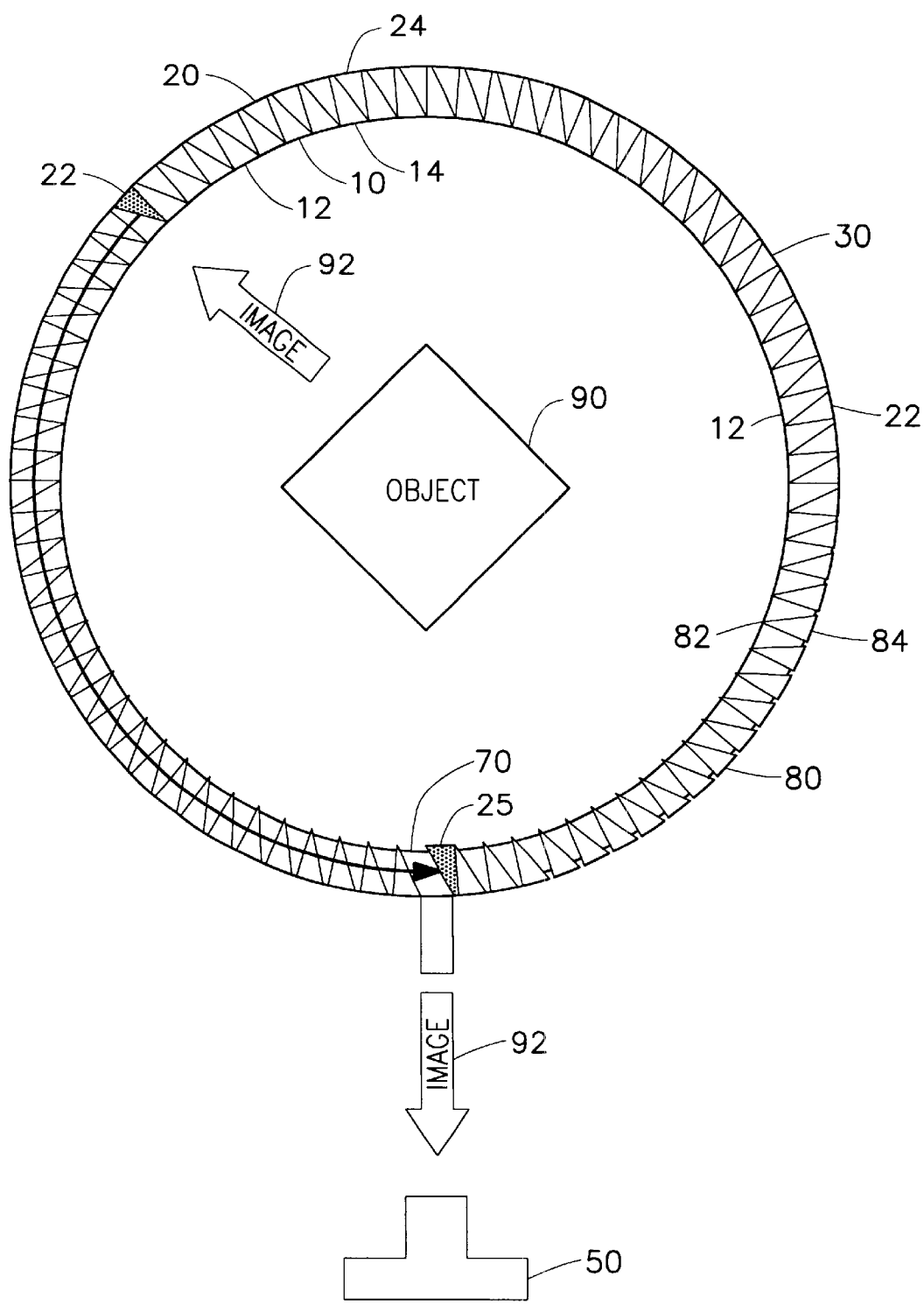
FIG. 8 is a top schematic view of the hologram system of the present invention.

A configuration for obtaining holographic images is shown in FIG. 8. Referring to FIG. 8, the prism sheet 30 is rolled into a cylinder 80 having an interior side 82 and an exterior side 84. For holograms, the cylinder 80 is rolled such that the interior side 82 is made up of the bases 14 of the prisms 12 of the first set of prisms 10. The postal end 32 and the distal end 34 of the prism sheet 30 are joined together with a junction prism 70, which, in the preferred embodiment of the present invention, is a Frensel rhomb. A single inverter prism 25 is fitted adjacent to the junction prism 70 as shown in FIG. 8. The inverter prism 25 can be made of any reflecting material, however, it is preferably constructed of the same electro-optical material as the second prisms 22 and is likewise connected to the sequencer 60. However, the inverter prism can also be a simple glass mirror or any other material that is constructed and arranged to reflect the image out of the prism sheet 30 and into the image receptor 50. The object 90 is positioned within the cylinder 80 and the image receptor is positioned outside of the cylinder 80 as shown in FIG. 8.

The method of operation of the present invention for holographic images is much the same as scanning flat images. The sequencer 60 activates one of the prisms 22 of the second set of prisms 20 in order to reflect an image of a portion (aspect) of the object 90 into the prism sheet 30 as shown in FIG. 8. The image is then refracted within the prism sheet 30, through the prisms 12 of the first set of prisms 10 and the deactivated prisms 22 of the second set of prisms 20 until it reaches the inverter prism 25 that is adjacent to the junction prism 70. The image is then reflected off of the inverter prism 25, passes through the junction prism 70 and then into the image receptor 50 as shown in FIG. 8. Once the image has been reflected, the sequencer 60 can release or remove the electromagnetic field from the prism 22 in question and apply an electromagnetic field to another prism 22 (that is not in the path of the refracting image) in preparation for the next image. This process is repeated with other prisms 22 of the second set of prisms 20 until all of the desired images are received by the image receptor 50. This methodology allows for rapid intake of images by the image receptor 50, so much so that near real-time imaging, such as animation, of the object 90 is possible.

Figure 9:
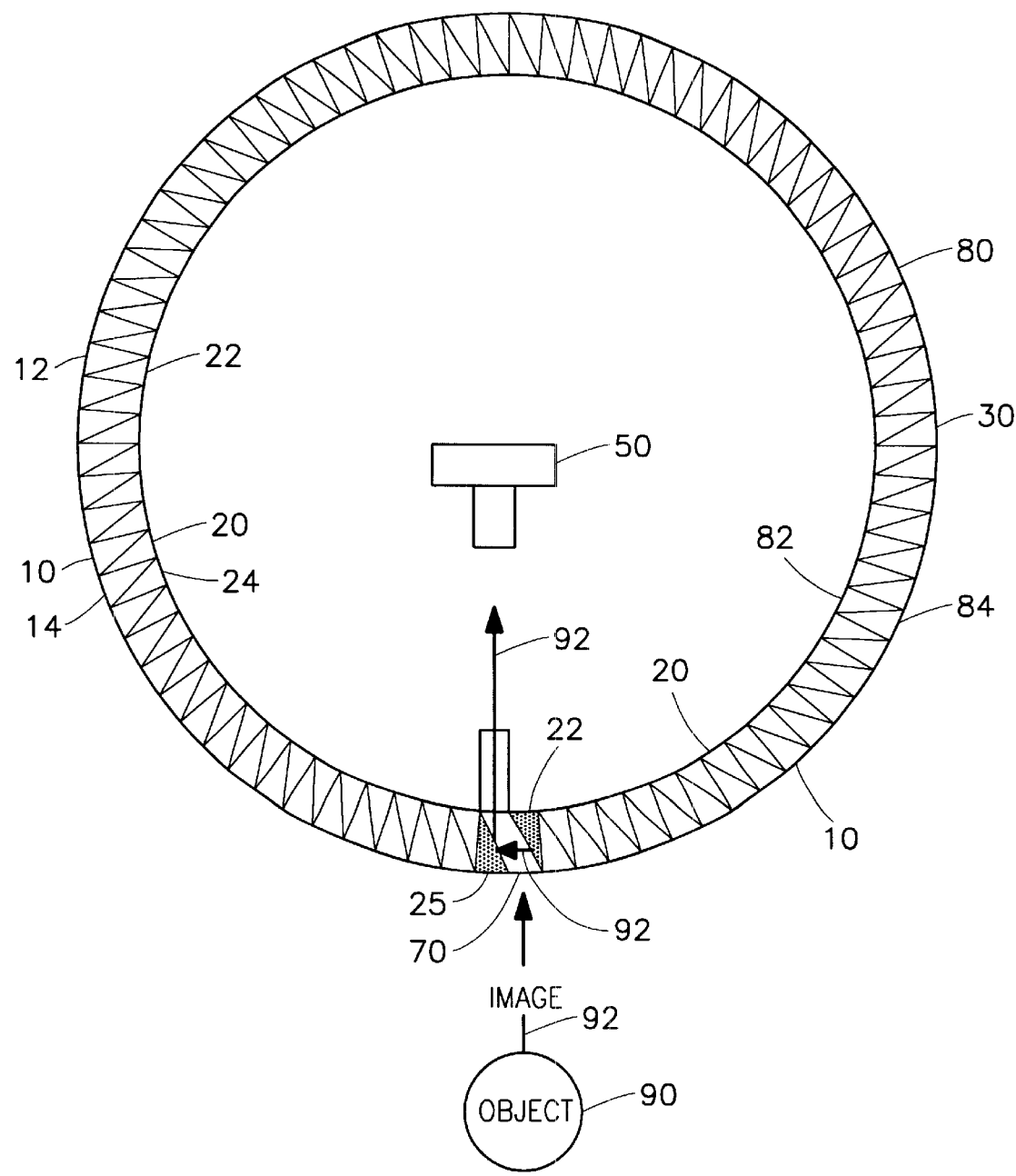
FIG. 9 is a top schematic view of the panoramic system of the present invention.

A configuration for obtaining panoramic images is shown in FIG. 9. Referring to FIG. 9, the prism sheet 30 is rolled into a cylinder 80 having an interior side 82 and an exterior side 84. For panoramic scenes, the cylinder 80 is rolled such that the exterior side 84 is made up of the bases 14 of the prisms 12 of the first set of prisms 10. The postal end 32 and the distal end 34 of the prism sheet 30 are joined together with a junction prism 70, which, in the preferred embodiment of the present invention, is a Frensel rhomb. A single inverter prism 25 is fitted adjacent to the junction prism 70 as shown in FIG. 9. The inverter prism 25 can be made of any reflecting material, however, it is preferably constructed of the same electro-optical material as the second prisms 22 and is likewise connected to the sequencer 60. However, the inverter prism can also be a simple glass mirror or other material that is angled so as to reflect the image out of the prism sheet 30 into the image receptor 50. The scene for which the panoramic view is desired, obviously, lies outside the cylinder 80. For this reason, the cylinder 80 is positioned at or near the center of the desired panoramic scene, such as a mountaintop. The image receptor 50 is typically placed within the cylinder 80 in line of sight of the inverter prism 25 as shown in FIG. 9.

The method of operation of the present invention for panoramic images is much the same as that for holographic images. The sequencer 60 activates one of the prisms 22 of the second set of prisms 20 in order to reflect an image 92 of a portion (aspect) of the objects 90 in the scene into the prism sheet 30 as shown in FIG. 9. The image 92 is then refracted within the prism sheet 30, through the prisms 12 of the first set of prisms 10 and the deactivated prisms 22 of the second set of prisms 20, and through the junction prism 70 until it reaches the inverter prism 25 that is adjacent to the junction prism 70. The image is then reflected off of the inverter prism 25, passes again through the junction prism 70 and then into the image receptor 50 as shown in FIG. 9. Once the image has been reflected, the sequencer 60 can release or remove the electromagnetic field from the prism 22 in question and apply an electromagnetic field to another prism 22 (that is not in the path of the refracting image) in preparation for the next image. This process is repeated with other prisms 22 of the second set of prisms 20 until all of the desired images are received by the image receptor 50. This methodology allows for rapid intake of images by the image receptor 50, so much so that near real-time imaging, such as animation, of the scene and the objects within it, is possible.

Figure 12:
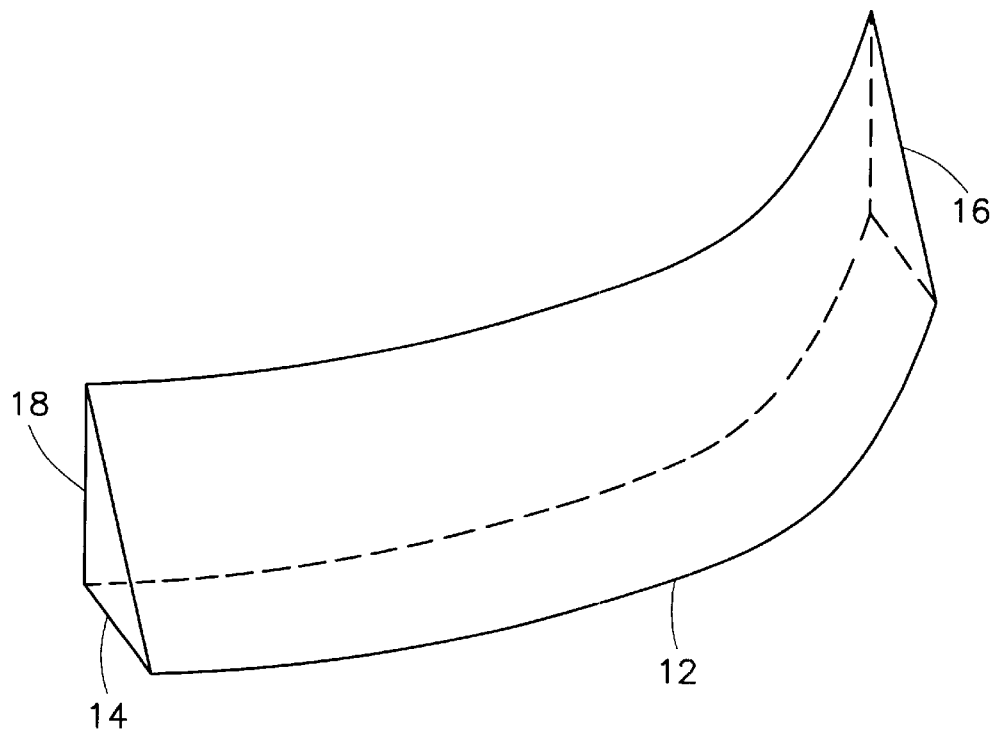
FIG. 12 is a side-top-front perspective view of a prism of an alternate embodiment of the present invention.
Figure 13:
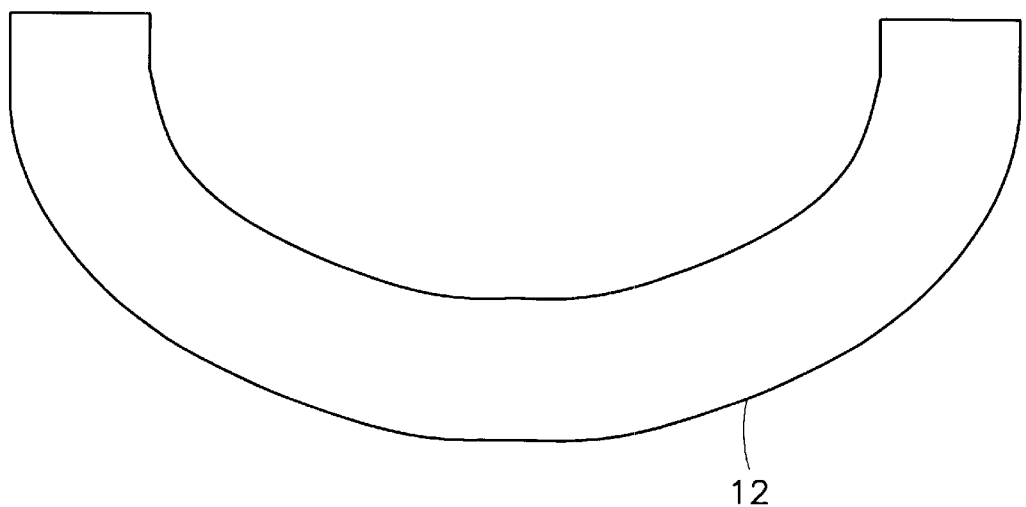
FIG. 13 is a front view of a prism of an alternate embodiment of the present invention.

The effect mentioned above could be taken one step further by placing multiple prism sheets 30 into a room and projecting various scenes into the prism sheets with appropriate emitters. This would give people placed within the room the sensation of being somewhere else, akin to a virtual reality. In yet another alternate embodiment of the present invention, the prisms 12 and 22 of the prism sheet 30 are curved or bent into a conic section, as shown in FIG. 12, or into a spherical or semi-spherical shape, as shown in FIG. 13. By making the shapes of the prism into various conic sections, prism sheets can be molded and fitted into spherical or other shapes. Panoramic or even three-dimensional images can be emitted into the prism sheets 30 to give people placed within the sphere the sensation of being in another place or even a pre-recorded, virtual, or computer-generated location. In yet another application of the alternate embodiment of the present invention, the entire prism sheet assembly can be miniaturized to the point where it can be inserted into small spaces. Once inserted, the prism sheets can take three-dimensional images from within the small space and transmit them to telemetry devices that can record and process the imagery. This technique would be of particular use to the medical industry for obtaining panoramic images from within the human body in a non-destructive and less-invasive manner.

It should be noted that the present invention does not need moving parts, such as positioning motors, as are required in the prior art devices. Nor does the present invention suffer from the blurring problem incumbent with the use of positioning devices. Finally, the solid-state nature of the present invention allows for the near real-time data (image) acquisition with the potential for obtaining animated holographic and panoramic information.

The present invention, therefore, is well adapted to carry out the objects and attain both the ends and the advantages mentioned, as well as other benefits inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An imaging system comprising:
   a set of transparent prisms;
   a set of controllable prisms interleaved with said transparent prisms and capable of changing from transparent to reflective to reflect an image upon the application of a stimulus and of changing from reflective to transparent upon the removal of said stimulus;
   an image receptor constructed and arranged to receive said image reflected from at least one of said controllable prisms; and
   a sequencer constructed and arranged to apply and remove said stimulus to each of said controllable prisms;
      such that when said sequencer sequentially applies and removes said stimulus to said controllable prisms, said image receptor receives sequentially different images.

2. An imaging system as in claim 1, wherein said controllable prisms interleaved with said transparent prisms are formed in the shape of a cylinder.

3. An imaging system as in claim 2, wherein said images are of an object and said object is placed within said cylinder and said image receptor is positioned outside of said cylinder such that said image receptor can receive a sufficient number of images of said object to construct a holograph of said object.

4. An imaging system as in claim 2, wherein said image receptor is positioned within said cylinder such that said image receptor can receive a sufficient number of images to construct a panoramic view around said cylinder.

5. An imaging system as in claim 1, wherein said controllable prisms interleaved with said transparent prisms define a prism sheet and said image receptor is positioned in proximity to a distal end of said prism sheet such that said image receptor can receive a sufficient number of said images from a substantially flat object placed adjacent to said prism sheet to construct a complete image of a side of said object.

6. An imaging system as in claim 1, wherein said transparent prisms and said controllable prisms are formed in the shape of a conic section or in the shape of a sphere.

7. The imaging system of claim 1, wherein:
   said set of transparent prisms includes at least two transparent prisms arranged in a sawtooth pattern of alternating prisms and gaps in a first orientation; and
   said set of controllable prisms including at least two controllable prisms arranged in a sawtooth pattern having prisms and gaps constructed and arranged to fit within said gaps of said set of transparent prisms.

8. An imaging system as in claim 1, wherein said transparent prisms and said controllable prisms are curved.

9. The imaging system of claim 1, wherein said stimulus is electromagnetic or thermal in nature.

10. The imaging system of claim 9, wherein said electromagnetic stimulus is an electromagnetic field.

11. The imaging system of claim 9, wherein said thermal stimulus is a thermal gradient.

12. The imaging system of claim 1, wherein application of said stimulus includes imposing an electromagnetic field or a thermal gradient.

13. The imaging system of claim 1, wherein application of said stimulus includes removing an electromagnetic field or a thermal gradient.

14. The imaging system of claim 1, wherein said set of transparent prisms interleaved with said set of controllable prisms define a flexible prism sheet.

15. A method for scanning at least one object, the method comprising sequentially applying and removing a stimulus to a set of controllable prisms interleaved with a set of transparent prisms such that each of said controllable prisms will sequentially change from transparent to reflective to reflect an image of at least a portion of said object until said images of all of said portions of said object have been obtained.

16. The method of claim 15, wherein applying said stimulus includes applying an electromagnetic stimulus or a thermal stimulus.

17. The method of claim 16, wherein applying said electromagnetic stimulus includes imposing or removing an electromagnetic field.

18. The method of claim 16, wherein applying said thermal stimulus includes imposing or removing a thermal gradient.

19. The method of claim 15, wherein said controllable prisms and said transparent prisms define a propagation path for said images and the method further comprises:
   reflecting said images from said controllable prisms to a junction prism through said propagation path; and
   reflecting said images from said junction prism to an image receptor.

20. The method of claim 15, further comprising arranging said set of controllable prisms interleaved with said set of transparent prisms to form a conic section or a sphere.

21. The method of claim 20, wherein said controllable prisms and said transparent prisms define a propagation path for said images and the method further comprises:
reflecting said images from said controllable prisms to a junction prism; and
reflecting said images from said junction prism to an image receptor.

22. The method of claim 21, further comprising positioning said image receptor inside said conic section or said sphere prior to reflecting said images from said junction prism to said image receptor.

23. The method of claim 21, further comprising positioning said image receptor outside said conic section or said sphere prior to reflecting said images from said junction prism to said image receptor.

* * * * *